(12) United States Patent
Chao

(10) Patent No.: US 10,855,892 B2
(45) Date of Patent: Dec. 1, 2020

(54) ELECTRONIC APPARATUS, AND LIGHT FIELD IMAGING SYSTEM AND METHOD WITH OPTICAL METASURFACE

(71) Applicant: SHENZHEN GOODIX TECHNOLOGY CO., LTD., Guangdong (CN)

(72) Inventor: Weimin Chao, Taipei (TW)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/423,639

(22) Filed: May 28, 2019

(65) Prior Publication Data

US 2020/0099836 A1 Mar. 26, 2020

Related U.S. Application Data

(60) Provisional application No. 62/736,825, filed on Sep. 26, 2018.

(51) Int. Cl.
*H04N 5/225* (2006.01)
*G02B 7/02* (2006.01)
(Continued)

(52) U.S. Cl.
CPC ............ *H04N 5/2254* (2013.01); *G02B 7/02* (2013.01); *G02B 27/0955* (2013.01); *H04N 5/2354* (2013.01)

(58) Field of Classification Search
CPC ............... H04N 5/2254; H04N 5/2354; G02B 27/0955; G02B 7/02
(Continued)

(56) References Cited

U.S. PATENT DOCUMENTS 5,517,278 A * 5/1996 Takahara ............. H04N 5/2251
348/E5.025
6,139,175 A * 10/2000 Tomioka ............. G02B 6/0006
362/268
(Continued)

FOREIGN PATENT DOCUMENTS

CN 102739945 A 9/2014
CN 105378556 A 3/2016
(Continued)

OTHER PUBLICATIONS

English Abstract Translation for Foreign Reference CN102739945A.
(Continued)

*Primary Examiner* — Yogesh K Aggarwal
(74) *Attorney, Agent, or Firm* — WPAT, P.C., Intellectual Property Attorneys; Anthony King

(57) ABSTRACT

A light field imaging system placed under a display and used as a front-facing camera in a portable electronic apparatus is provided. The light field imaging system includes a lens unit, an optical metasurface and an image sensor. The lens unit is configured to collect input light from a scene and output a light signal. The optical metasurface, disposed in an optical path of the light signal, is configured to produce an optical signal in response to the light signal. The optical metasurface has a spatially varying optical response to the light signal. The image sensor is configured to sense the optical signal to generate light field image data.

20 Claims, 8 Drawing Sheets

(51) Int. Cl.
*G02B 27/09* (2006.01)
*H04N 5/235* (2006.01)

(58) Field of Classification Search
USPC ............... 348/335, 340, 345, 348, 350, 352
See application file for complete search history.

(56) References Cited

U.S. PATENT DOCUMENTS

| | | | |
|---|---|---|---|
| 10,330,889 B2* | 6/2019 | Nam | G02B 7/10 |
| 2015/0219806 A1* | 8/2015 | Arbabi | G02B 5/1828 |
| | | | 359/573 |
| 2016/0306079 A1 | 10/2016 | Arbabi et al. | |
| 2017/0146806 A1 | 5/2017 | Lin et al. | |
| 2017/0201658 A1 | 7/2017 | Rosenblatt et al. | |

FOREIGN PATENT DOCUMENTS

| | | |
|---|---|---|
| CN | 105931190 A | 9/2016 |
| CN | 108419070 A | 8/2018 |

OTHER PUBLICATIONS

English Abstract Translation for Foreign Reference CN105378556A.
English Abstract Translation for Foreign Reference CN105931190A.
English Abstract Translation for Foreign Reference CN108419070A.

* cited by examiner

ELECTRONIC APPARATUS, AND LIGHT FIELD IMAGING SYSTEM AND METHOD WITH OPTICAL METASURFACE

PRIORITY CLAIM AND CROSS-REFERENCE

The present application claims priority to U.S. Provisional Patent Application No. 62/736,825, filed on Sep. 26, 2018, which is incorporated by reference herein in its entirety.

TECHNICAL FIELD

The present disclosure relates to light field imaging and, more particularly, to a light field imaging system utilizing an optical metasurface, a light field imaging method and a light field imaging system placed under a transparent display.

BACKGROUND

By capturing and processing light field information about a scene and, light field imaging allows the user to reconstruct or refocus images after the images are taken. As the light field information contains color, intensity, wavefront and direction information of individual light rays coming from the scene, some computational techniques, such as compressive sensing, are used for processing such huge amounts of data. The light field imaging can also adopt deep learning, which is a machine learning technique, to perform light field estimation.

SUMMARY

The described embodiments provide a light field imaging system utilizing an optical metasurface, a light field imaging method and a light field imaging system placed under a display, such as a transparent display, of a portable electronic apparatus.

Some embodiments described herein comprise a light field imaging system. The light field imaging system comprises a lens unit, an optical metasurface and an image sensor. The lens unit is configured to collect input light from a scene and output a light signal. The optical metasurface, disposed in an optical path of the light signal, is configured to produce an optical signal in response to the light signal. The optical metasurface has a spatially varying optical response to the light signal. The image sensor is configured to sense the optical signal to generate light field image data.

Some embodiments described herein comprise a light field imaging method. The light field imaging method comprises the following steps: utilizing a lens unit to collect input light from a scene and direct collected light toward an optical metasurface, the optical metasurface having a spatially varying optical response to the collected light; utilizing the optical metasurface to control propagation of the collected light and accordingly produce an optical signal; sensing the optical signal to generate light field image data; and imaging the scene according to the light field image data Some embodiments described herein comprise an electronic apparatus. The electronic apparatus comprises a display and a light field imaging system. The light field imaging system is placed behind the display and configured to capture a scene in front of the display. The light field imaging system comprises a lens unit, an optical metasurface and an image sensor. The lens unit is configured to collect input light from the scene through the display, and accordingly output a light signal. The optical metasurface, disposed in an optical path of the light signal, is configured to produce an optical signal in response to the light signal. The optical metasurface has a spatially varying optical response to the light signal. The image sensor is configured to sense the optical signal to generate light field image data.

The light field imaging scheme utilizing an optical metasurface can provide high spatial and angular resolution concurrently. Also, by adjusting a distance between a lens unit and an optical metasurface, the light field imaging scheme can realize a multi-mode light field imaging scheme. Further, with the use of an adjustable aperture, the light field imaging scheme can perform aberration correction and reduce the thickness of the lens unit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION

Figure 1A:
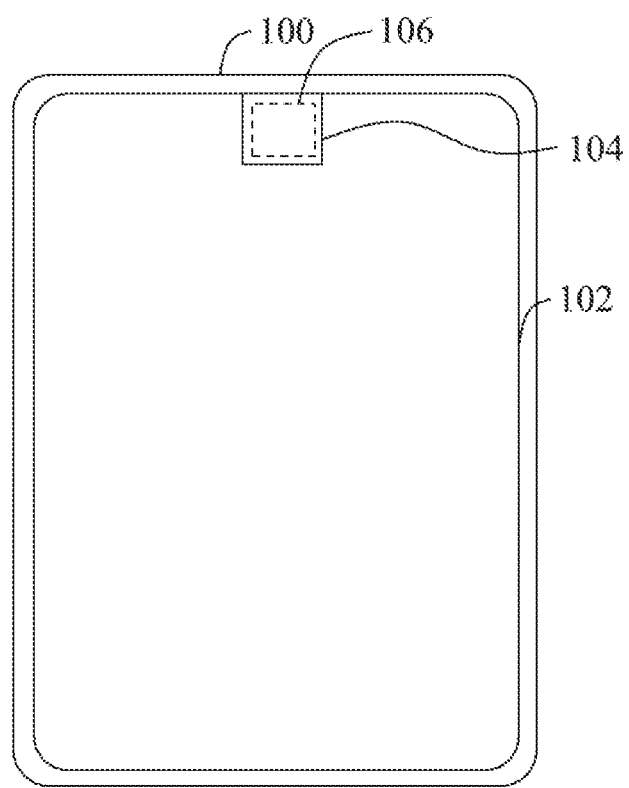
FIG. 1A illustrates an exemplary electronic apparatus in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, it will be understood that when an element is referred to as being "connected to" or "coupled to" another element, it may be directly connected to or coupled to the other element, or intervening elements may be present.

A light field camera may utilize a microlens array (MLA) to capture angular distribution and spatial distribution of light coming from a scene, thereby reconstructing an image of the scene according to the captured angular and spatial light field information. For example, when an image sensor is disposed on a rear focal plane of the MLA, pixels of the image sensor behind each microlens can capture light field information about light rays coming from a main lens in different directions. The main lens is disposed in front of the MLA. The spatial resolution of the light field camera is determined according to the number of microlenses in the MLA. The angular resolution of the light field camera is determined according to the number of pixels behind each microlens. As another example, when an image plane, on which an image formed by the main lens is focused, is located in front of the MLA, the MLA is configured to project the image onto the image sensor which is located behind the MLA. The spatial resolution of the light field camera is determined according to the number of pixels behind each microlens. The angular resolution of the light field camera is determined according to the number of microlenses in the MLA. However, as the single image sensor is used to capture both spatial and angular information, the light field camera utilizing the MLA exhibits low spatial resolution.

The present disclosure describes exemplary light field imaging systems which utilize an optical metasurface for capturing light field data. The optical metasurface can enable a predetermined spatially varying optical response to modify optical properties of incident light, thus acting as a lens having a high numerical aperture (NA). In some embodiments, the light field imaging system can exhibit not only high spatial resolution but also high angular resolution. The present disclosure further describes exemplary light field imaging methods, which are capable of obtaining high spatial and angular resolution image data with the use of an optical metasurface.

FIG. 1A illustrates an exemplary electronic apparatus 100 in accordance with some embodiments of the present disclosure. The electronic apparatus 100 can be implemented as a portable electronic apparatus such as a mobile phone, a tablet computer, a laptop computer or any other types of portable electronic apparatuses. The electronic apparatus 100 includes a first display 102, a second display 104 and a light field imaging system 106. The first display 102 and the second display 104 are configured to provide a display area of the electronic apparatus 100. The first display 102 can serve as a main display of the electronic apparatus 100. The second display 104 can be implemented by, but is not limited to, a transparent display or a partially transparent display. For example, the second display 104 can be implemented by a see-through transparent display. As another example, the second display 104 can be implemented by a see-through transparent organic light-emitting diode (OLED) display. In some embodiments, the first display 102 can also be implemented by a transparent display or a partially transparent display. In some embodiments, the first display 102 and the second display 104 can be integrated into a single transparent display or a single partially transparent display.

The light field imaging system 106 can be implemented as a multi-aperture/multi-angle camera device. The light field imaging system 106, placed under the second display 104, is configured to record light field information on a scene SCN through the second display 104 to thereby produce/reconstruct an image of the scene SCN. For example, the light field imaging system 106 can be implemented as at least a portion of a front-facing camera of a mobile phone. As another example, the light field imaging system 106 can be implemented as an under-display camera.

In operation, when the second display 104 is turned on, it can show the texts and graphics and make the light field imaging system 106 non-obvious or invisible. When turned off, the high-transmittance second display 104 can utilize transparent pixel windows to avoid light absorption caused by optical materials (not shown in FIG. 1A). Hence, the light field imaging system 106 can see the world through these transparent pixel windows.

As a pixel structure of a transparent display can influence see-through image quality thereof, an array of transparent pixel windows of the transparent display may diffract light from ambient objects, resulting in blurred images. One strategy to improve the see-through image quality is using lower resolution of a transparent display, since a sparse structure of the transparent display can weaken diffraction and lead to higher image equality. However, the lower resolution leads to worse display quality. Another strategy is using a camera having a smaller aperture to thereby weaken diffraction effects and produce better images. However, the lower aperture limits light source selection.

With the use of an optical metasurface for capturing light field data, the light field imaging system 106, e.g. an under-display camera, can exhibit not only high spatial resolution but also high angular resolution. In addition, various light sources are applicable to the light field imaging system 106.

Figure 1B:
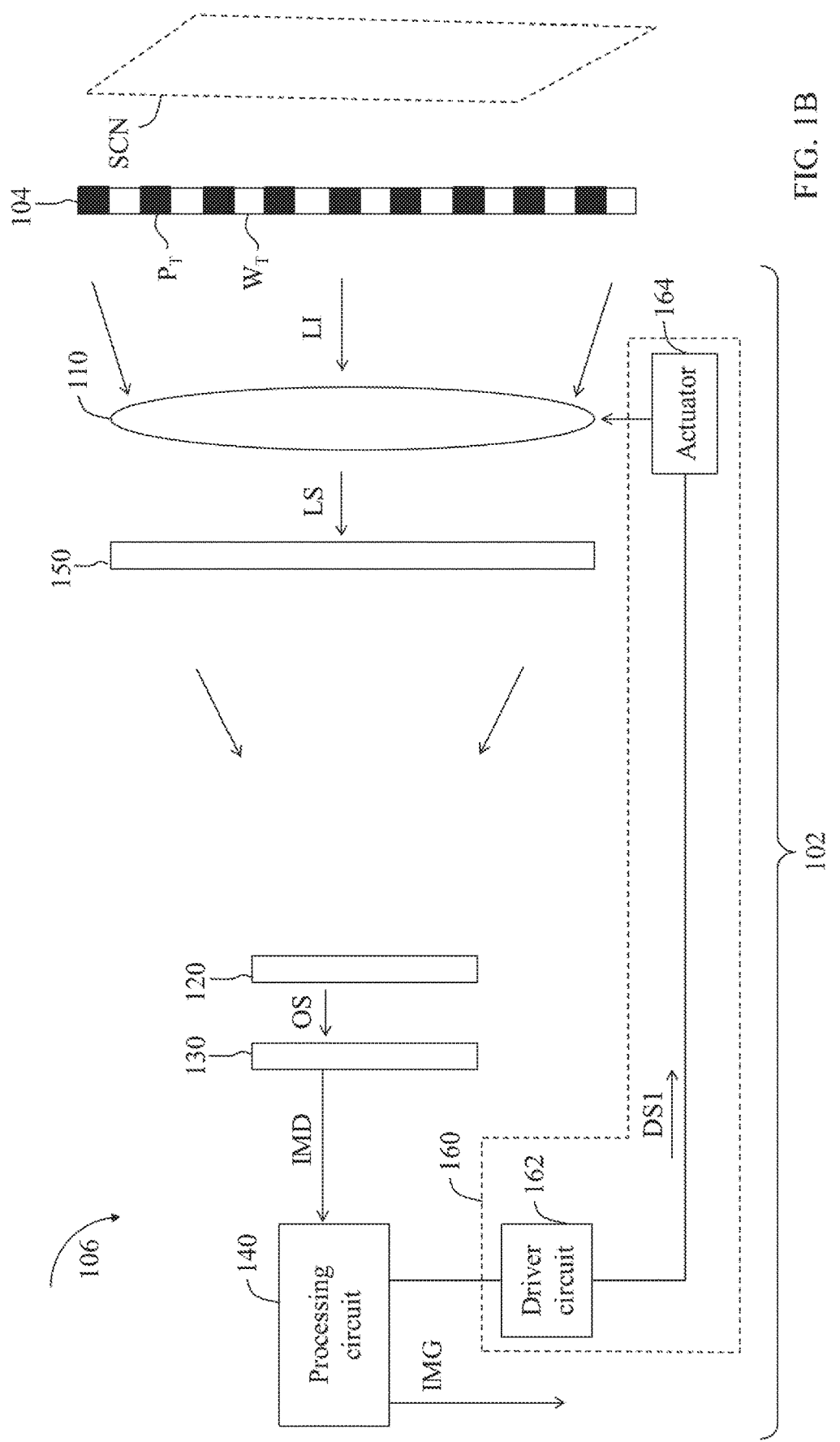
FIG. 1B illustrates an implementation of the light field imaging system shown in FIG. 1A in accordance with some embodiments of the present disclosure.

FIG. 1B illustrates an implementation of the light field imaging system 106 shown in FIG. 1A in accordance with some embodiments of the present disclosure. The light field imaging system 106, placed behind the second display 104, is configured to capture the scene SCN in front of the second display 104. The light field imaging system 106 includes, but is not limited to, a lens unit 110, an optical metasurface 120, an image sensor 130 and a processing circuit 140. The lens unit 110 is configured to collect input light LI from the scene SCN and output a light signal LS, e.g. collected light. The lens unit 110 can be implemented using one or more lenses. In the present embodiment, the lens unit 110 can be a main lens unit of the light field imaging system 106.

The optical metasurface 120, disposed in an optical path of the light signal LS, is configured to produce an optical signal OS in response to the light signal LS incident thereon. The optical metasurface 120 may have a spatially varying optical response to the light signal LS. Based on the spatially varying optical response, the optical metasurface 120 may modify optical properties of the light signal LS to produce the optical signal OS. For example, the optical metasurface 120 may enable the spatially varying optical response by imposing a parabolic phase profile on the light signal LS, such that the optical metasurface 120 can act as a wideband flat focusing lens. As another example, the optical metasurface 120 may enable the spatially varying optical response by imposing a hyperboloidal phase profile on the light signal LS, such that the optical metasurface 120 can act as a lens having a high numerical aperture (NA) without aberrations.

The optical metasurface 120 can be implemented by a plasmonic metasurface, a dielectric metasurface, a geometric metasurface, a Huygens' metasurface or other types of metasurfaces. In the present embodiment, the optical metasurface 120 may include a plurality of scattering elements (not shown in FIG. 1) disposed in a two dimensional manner. The scattering elements can be implemented using metallic nanoparticles, dielectric nanoparticles, apertures formed in metallic films, and multi-layers structures thereof. Each scattering element may be a subwavelength-scale structure for controlling light propagation. The scattering elements can have spatially varying orientations, geometries and/or materials, thereby providing different local optical responses on the light signal LS, such as amplitude responses, phase responses, polarization responses, or combinations thereof. As a result, the optical metasurface 120 can introduce the spatially varying optical response to modify the optical properties of the light signal LS.

The image sensor 130, disposed behind the optical metasurface 120, is configured to sense the optical signal OS to generate light field image data IMD of the scene SCN. For example, the image sensor 130 can include a pixel array (not shown in FIG. 1). Each pixel in the pixel array is configured to sense intensities of light beams included in the optical signal OS.

The processing circuit 140, coupled to the image sensor 130, is configured to process the light field image data IMD to obtain an image IMG of the scene SCN. The processing circuit 140 can be implemented to include an image signal processor (ISP) for performing associated operations upon the light field image data IMD. By way of example but not limitation, the processing circuit 140 can perform refocusing operations, three-dimensional image rendering, image reconstruction, image correction or other types of signal processing operations upon the light field image data IMD.

In the present embodiment, the second display 104, disposed in front of the lens unit 110, includes a plurality of pixels $P_T$ such as OLED pixels. A plurality of transparent windows $W_T$ are located in between the pixels $P_T$. The pixels $P_T$ can be turned on to display texts and graphic contents on a side facing the scene SCN. When the pixels $P_T$ are turned off, the input light LI from the scene SCN is transmitted and diffracted via the transparent windows $W_T$ between the pixels $P_T$.

In operation, the lens unit 110 can direct the input light LI coming from the scene SCN toward the image sensor 130. The light signal LS, outputted from the lens unit 110, is incident on the optical metasurface 120 located between the image sensor 130 and the lens unit 110. The optical metasurface 120, capable of acting as a high NA ultrathin lens, can modify optical properties of the light signal LS to produce the optical signal OS. The image sensor 130 can sense the optical signal OS to generate the light field image data IMD, which carries information on spatial and angular distribution of the input light LI. As a result, the processing circuit 140 can produce the image IMG, such as a perspective image of the scene SCN, according to the light field image data IMD.

As the optical metasurface 120 can create spatial variations with subwavelength resolution and act as a high NA lens, the light field imaging system 106 can provide high spatial resolution and high angular resolution concurrently.

In the present embodiment, the light field imaging system 106 may further include a filter device 150, which is disposed between the lens unit 110 and the optical metasurface 120. The filter device 150 is configured to filter the light signal LS and output a filtered version of the light signal LS toward the optical metasurface 120. The filter device 150 can be configured to filter one or more frequency bands according to application scenarios.

For example, when the light field imaging system 106 operates as a color camera, the filter device 150 can be implemented as an infrared cut-off (IR-cut) filter for filtering out IR light beams, thereby reducing color distortion. As a result, the light field imaging system 106 can provide true color images and enhance the viewing experience. As another example, when the light field imaging system 106 operates as an IR camera, the filter device 150 can be implemented as an infrared pass (IR-pass) filter for pass IR light beams while blocking other wavelengths. As a result, the light field imaging system 106 can detect IR energy and produce thermal images. It is worth noting that the filter device 150 may be optional without departing from the scope of the present disclosure.

The light field imaging system 106 may further include a control circuit 160 to provide a multi-mode light field imaging scheme. The control circuit 160, coupled to the lens unit 110, is configured to move the lens unit 110 to adjust a position of an image plane of the lens unit 110. The control circuit 160 can also be configured to control operations of the processing circuit 140. In the present embodiment, the control circuit 160 includes, but is not limited to, a driver circuit 162 and an actuator 164. The driver circuit 162 is configured to generate a drive signal DS1 in response to an operating mode of the light field imaging system 106. The actuator 164 is configured to move the lens unit 110 toward or away from the image sensor 130 according to the drive signal DS1, thereby adjusting the position of the image plane of the lens unit 110. It is worth noting that the circuit implementation of the control circuit 160 is provided for illustrative purposes. Those skilled in the art will recognize that other circuit implementations of the control circuit 160 are also within the contemplated scope of the present disclosure.

Figure 2:
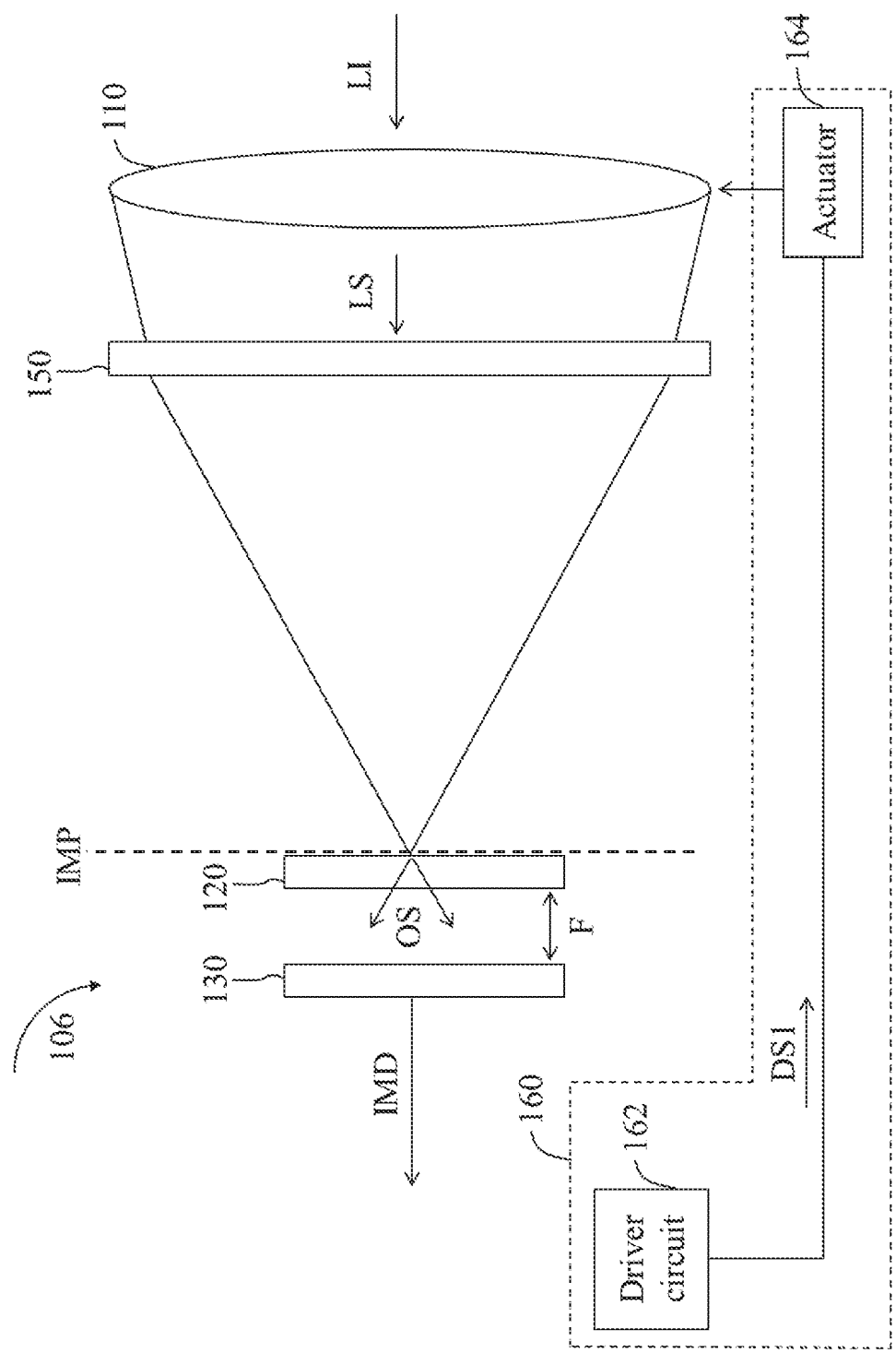
FIG. 2 illustrates an operating mode of the light field imaging system shown in FIG. 1 in accordance with some embodiments of the present disclosure.
Figure 3:
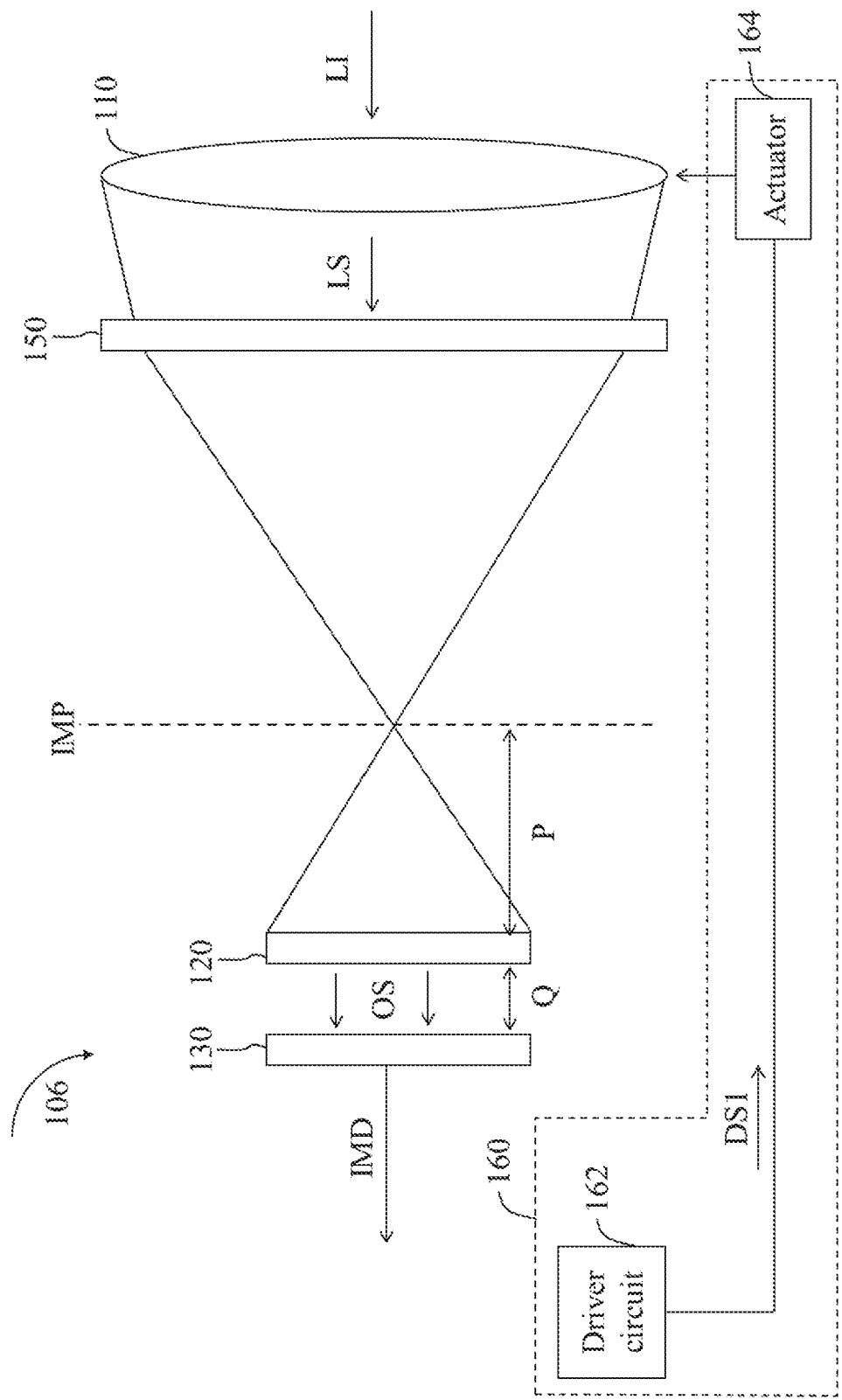
FIG. 3 illustrates another operating mode of the light field imaging system shown in FIG. 1 in accordance with some embodiments of the present disclosure.

FIG. 2 and FIG. 3 illustrate different operating modes of the light field imaging system 106 shown in FIG. 1 in accordance with some embodiments of the present disclosure. Referring first to FIG. 2, the control circuit 160 is configured to move the lens unit 110 to a predetermined position such that an image plane IMP of the lens unit 110 is located at the optical metasurface 120. In the present embodiment, the light field imaging system 106 operates in a first imaging mode. The actuator 164 can move the lens unit 110 according to the drive signal DS1, thereby moving the image plane IMP of the lens unit 110 to the optical metasurface 120. As the image plane IMP of the lens unit 110 is located at the optical metasurface 120, the image sensor 130 can be regarded as being located a focal length F of the optical metasurface 120. Pixels of the image sensor 130 behind a local region on the optical metasurface 120, such as a region where a scattering element is disposed, can capture light field information on light beams in different directions. As a result, the optical signal OS produced by the optical metasurface 120 includes angular samples of the light signal LS. Since the optical metasurface 120 can create spatial variations with subwavelength resolution and act as a high NA lens, the light field imaging system 106 can have a relatively high angular resolution. The first imaging mode can also be referred to as an angular mode.

Referring to FIG. 3, the control circuit 160 is configured to move the lens unit 110 to a predetermined position such that the image plane IMP is located between the optical metasurface 120 and the lens unit 110. In the present embodiment, the light field imaging system 106 operates in a second imaging mode. The actuator 164 can move the lens unit 110 according to the drive signal DS1, thereby moving the image plane IMP of the lens unit 110 to the optical metasurface 120. As the image plane IMP of the lens unit 110 is located between the optical metasurface 120 and the lens unit 110, the image plane IMP can be regarded as being located at an object distance P from the optical metasurface 120, and the image sensor 130 can be regarded as being located at an image distance Q from the optical metasurface 120. The image plane IMP serves as a virtual image plane focused in front of the optical metasurface 120. As a result, the optical metasurface 120 can project such virtual image plane onto the image sensor 130. A local region on the optical metasurface 120, such as a region where a scattering element is disposed, can project a portion of an image on the virtual image plane from a viewpoint. As a result, the optical signal OS produced by the optical metasurface 120 includes spatial samples of the light signal LS. Since the optical metasurface 120 can create spatial variations with subwavelength resolution and act as a high NA lens, the light field imaging system 106 can have a relatively high spatial resolution. The second imaging mode can also be referred to as a spatial mode.

Figure 4:
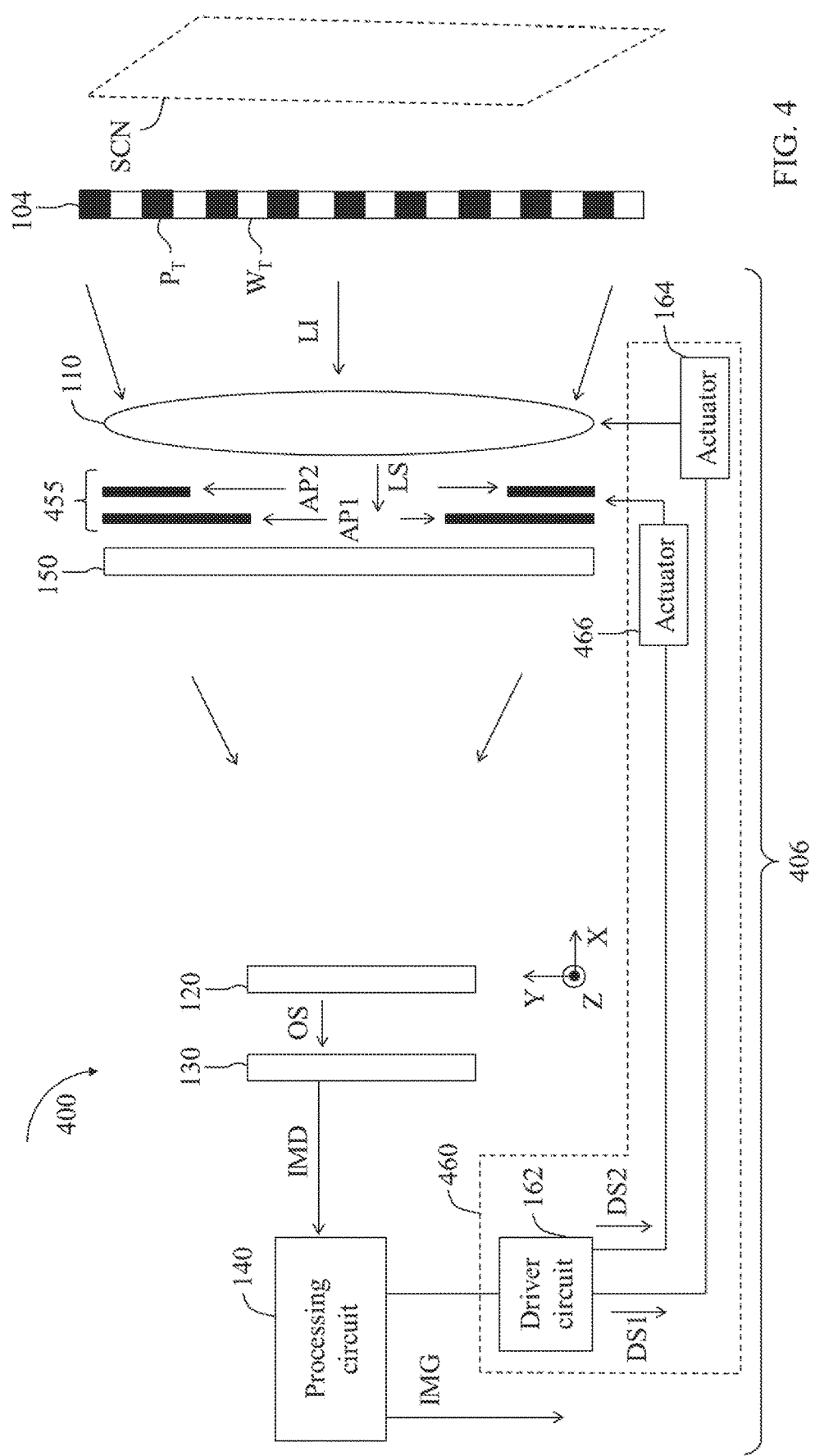
FIG. 4 illustrates an exemplary electronic apparatus in accordance with some embodiments of the present disclosure.

In some embodiments, the light field imaging scheme utilizing an optical metasurface can utilize an adjustable aperture to increase imaging quality. Referring to FIG. 4, a light field imaging system 406 in an electronic apparatus 400 is illustrated in accordance with some embodiments of the present disclosure. The electronic apparatus 400 can be an embodiment of the electronic apparatus 100 shown in FIG. 1. The light field imaging system 406 can be an embodiment of the light field imaging system 106 shown in FIG. 1. The structure of the light field imaging system 406 is similar to that of the light field imaging system 106 shown in FIG. 1 except for an aperture adjusting mechanism. The light field imaging system 406 includes the lens unit 110, the optical metasurface 120, the image sensor 130, the processing circuit 140 and the filter device 150 shown in FIG. 1, and further includes an aperture unit 455 and a control circuit 460. The aperture unit 455, disposed in the optical path of the light signal LS, has an adjustable aperture. The light signal LS passes through the aperture unit 455 before arriving at the optical metasurface 120. The control circuit 460, coupled to the aperture unit 455, is configured to change an aperture size of the aperture unit 455 to adjust an amount of light passing through the aperture unit 455.

Two different sizes AP1 and AP2 used by the aperture unit 455 as the aperture size are shown in FIG. 4 for illustrative purposes. Those skilled in the art will recognize that an aperture unit utilizing more than one size as an aperture size is also within the contemplated scope of the present disclosure. In the present embodiment, when the light field imaging system 406 uses the size AP1 as the aperture size to acquire image data, the amount of light directed along an outer edge of the lens unit 110 may be reduced since the size AP1 is smaller than the size AP2. As a result, the light field imaging system 406 can utilize the size AP1 to position the scene SCN. For example, the processing circuit 140 can be configured to position the scene SCN according to the light field image data IMD. When the light field imaging system 406 uses the size AP2 as the aperture size to acquire image data, the amount of light reaching the optical metasurface 120 or the image sensor 130 is increased. As a result, the light field imaging system 406 can utilize the aperture size AP2 to capture the scene SCN. For example, the processing circuit 140 can be configured to capture the scene SCN according to the light field image data IMD.

In some embodiments, as the amount of light directed along an outer edge of the lens unit 110 is reduced when the size AP1 is used as the aperture size, an image obtained using the size AP1 can be provided for aberration correction such as chromatic aberration correction. For example, when the aperture unit 455 uses the size AP1 as the aperture size in image acquisition, the processing circuit 140 is configured to obtain a first image of the scene SCN according to the light field image data IMD. When the aperture unit 455 uses the size AP2 larger than the size AP1 as the aperture size, the processing circuit 140 is configured to obtain a second image of the scene SCN according to the light field image data IMD. The processing circuit 140 can be configured further to perform the aberration correction upon the second image according to the first image. It is worth noting that as the light field imaging system 406 can include a small aperture for correcting aberration, the number of layers used to implement the lens unit 110 can be reduced.

Figure 5:
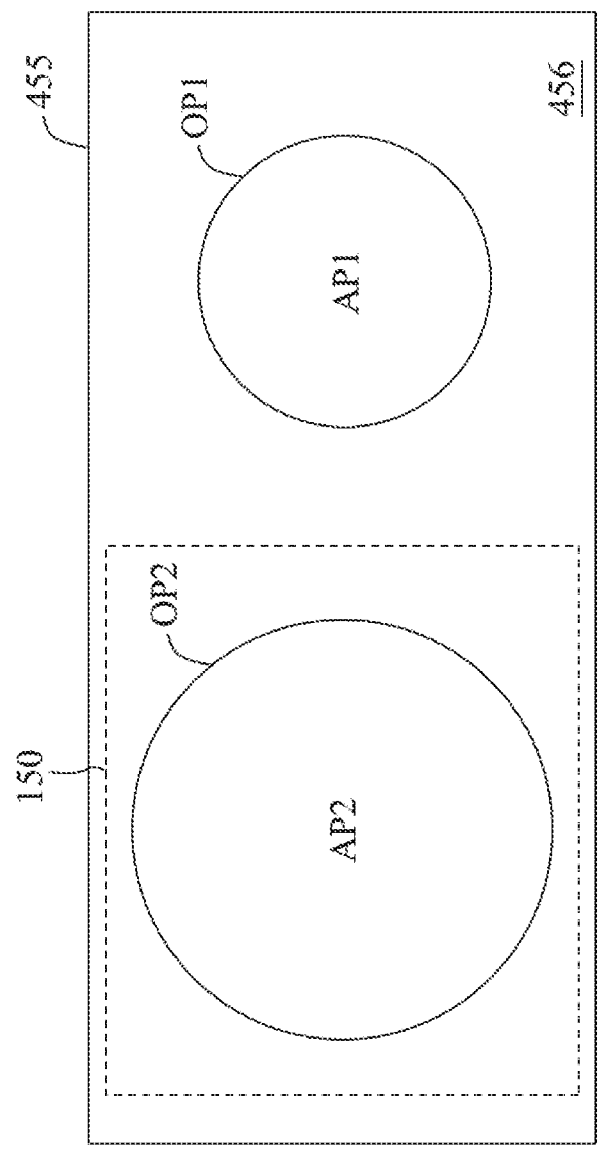
FIG. 5 illustrates a cross-sectional view, looking in the direction of the X axis, of the aperture unit shown in FIG. 4 in accordance with some embodiments of the present disclosure.

For illustrative purposes, the aperture adjusting mechanism is described as follows with reference to an actuator and an aperture unit having multiple openings formed therein. However, this is not intended to limit the scope of the present disclosure. FIG. 5 illustrates a cross-sectional view, looking in the direction of the X axis, of the aperture unit 455 shown in FIG. 4 in accordance with some embodiments of the present disclosure. Referring to FIG. 5 and also to FIG. 4, the aperture unit 455 has a plurality of openings OP1 and OP2 arranged in a Y-axis direction. The aperture unit 455 and the lens unit 110 are disposed along another direction different from the Y-axis direction, which can be an X-axis direction in the present embodiment. The openings OP1 and OP2, formed in a plate 456, have the sizes AP1 and AP2, respectively. The control circuit 460 is configured to move the aperture unit 455 in the Y-axis direction to change the aperture size of the aperture unit 455.

In the present embodiment, the control circuit 460 may include the driver circuit 162 and the actuator 164 shown in FIG. 1, and an actuator 466. The driver circuit 162 is further configured to generate a drive signal DS2 to control the actuator 466. The actuator 466 is configured to move the aperture unit 455 in the Y-axis direction according to the drive signal DS2, thereby swapping the openings OP1 and OP2 to adjust the aperture size of the aperture unit 455. The amount of light passing through the aperture unit 455 can be adjusted accordingly.

Figure 6:
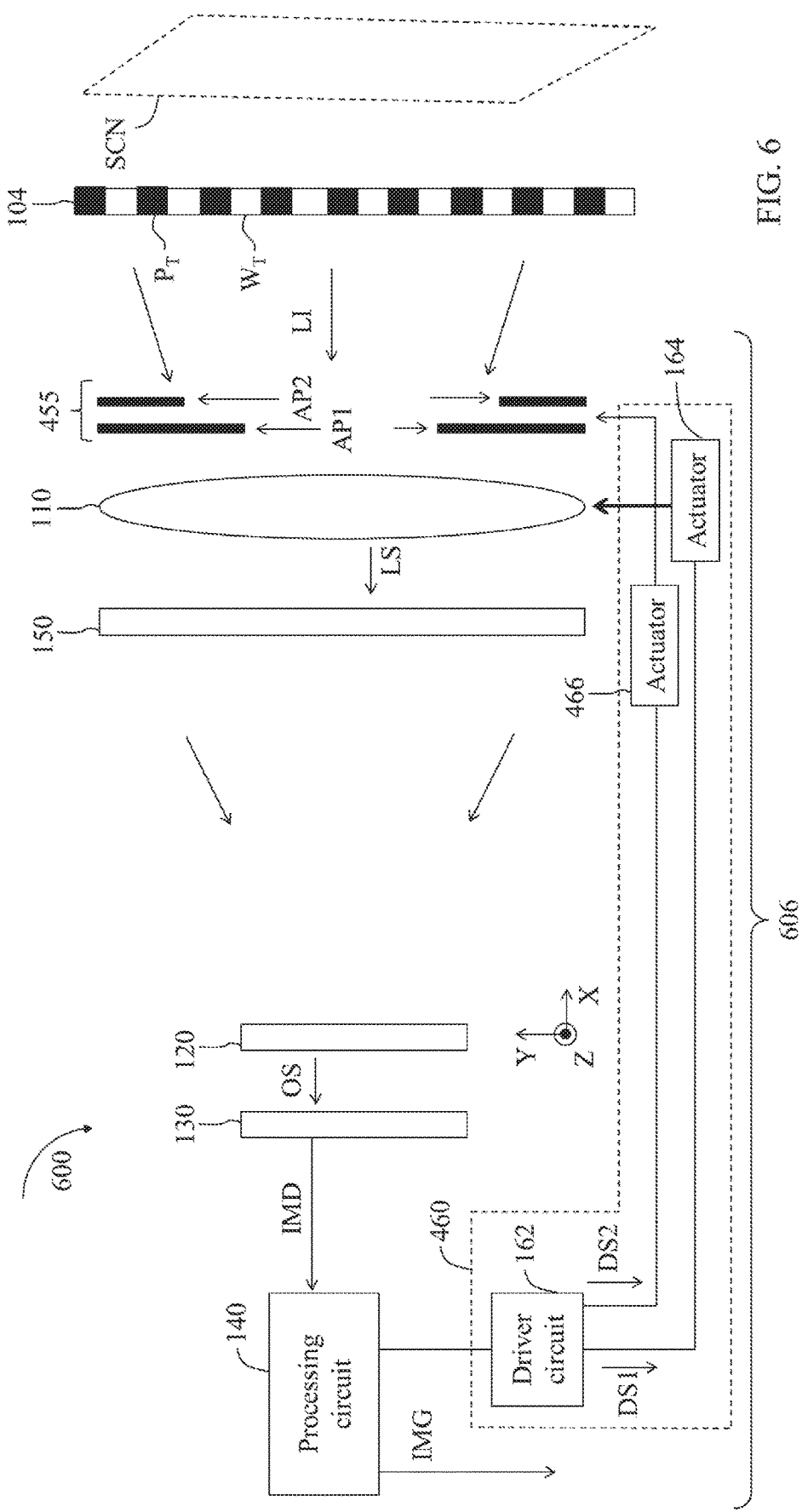
FIG. 6 illustrates an exemplary electronic apparatus in accordance with some embodiments of the present disclosure.

The above is provided for illustrative purposes, and is not intended to limit the scope of the present disclosure. In some embodiments, the control circuit 460 can be implemented using other circuit structures. For example, one of the actuator 164 and the actuator 466 may be optional. Adjustment of the lens unit 110 and the aperture unit 455 can be controlled by a same actuator. The actuator, such as the actuator 164 or the actuator 466, can be configured to adjust a position of an image plane of the lens unit 110, e.g. the position of the image plane IMP shown in FIG. 2 or FIG. 3, according to the drive signal DS1, and can be further configured to move the aperture unit 455 in the Y-axis direction according to the drive signal DS2. In some embodiments, the aperture unit 455 can be implemented by other types of aperture units having multiple aperture sizes. In some embodiments, the aperture unit 455 can be disposed in front of the lens unit 110 such that the input light LI can pass through the aperture unit 455 before arriving at the lens unit 110. For example, in the embodiment shown in FIG. 6, the aperture unit 455 of the light field imaging system 606 is disposed in front of the lens unit 110 in the electronic apparatus 600. It is worth noting that any light field imaging system, which is capable of producing an imaging result according to image data obtained using different aperture sizes, falls within the scope of the present disclosure.

Figure 7:
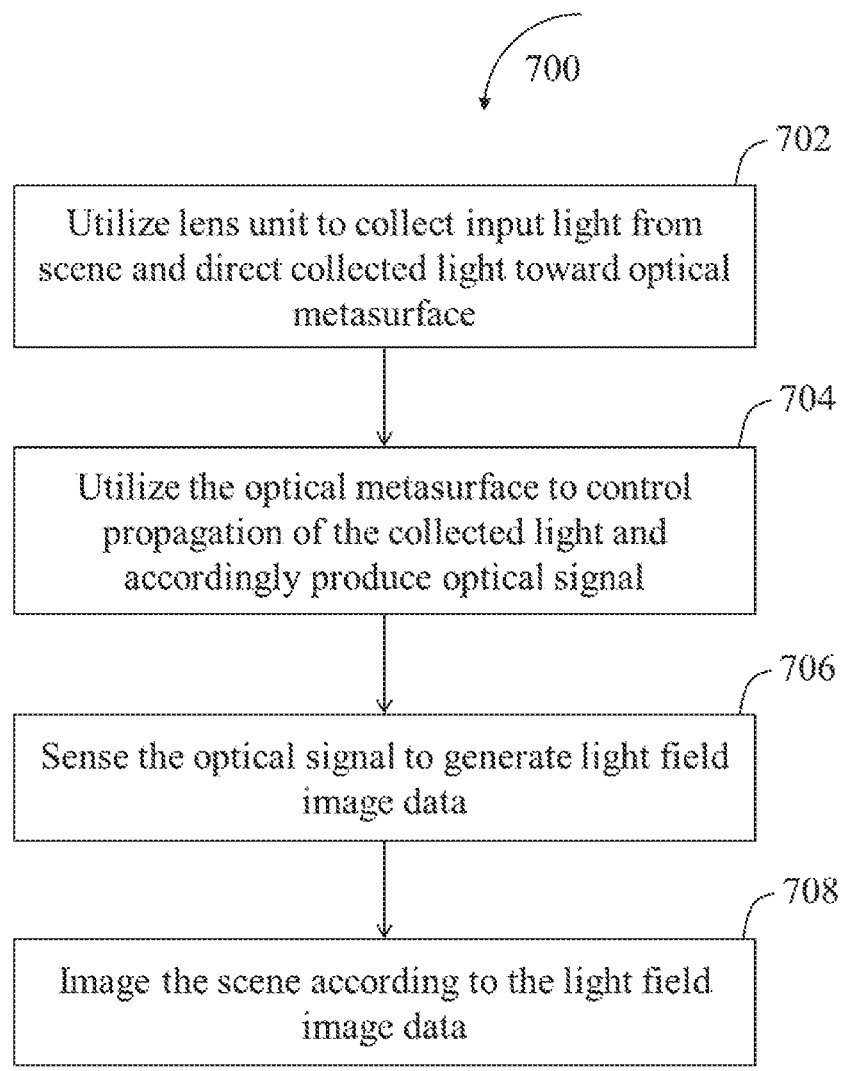
FIG. 7 is a flowchart of an exemplary light field imaging method in accordance with some embodiments of the present disclosure.

FIG. 7 is a flowchart of an exemplary light field imaging method in accordance with some embodiments of the present disclosure. For illustrative purposes, the light field imaging method 700 is described with reference to the light field imaging system 406 shown in FIG. 4. Those skilled in the art will recognize that the light field imaging method 700 can be utilized to control the light field imaging system 106 shown in FIG. 1 without departing from the scope of the present disclosure. Additionally, in some embodiments, other operations in the light field imaging method 700 can be performed. In some embodiments, operations of the light field imaging method 700 can be performed in a different order and/or vary.

At operation 702, a lens unit is utilized to collect input light from a scene, and direct collected light toward an optical metasurface. The optical metasurface has a spatially varying optical response to the collected light. For example, the lens unit 110 may collect the input light LI from the scene SCN and direct collected light, i.e. the light signal LS, toward the optical metasurface 120.

At operation 704, the optical metasurface is utilized to control propagation of the collected light and accordingly produce an optical signal. For example, the optical metasurface 120 may control propagation of the light signal LS and accordingly produce the optical signal OS.

At operation 706, the optical signal is sensed to generate light field image data. For example, the image sensor 130 may sense the optical signal OS to generate the light field image data IMD.

At operation 708, the scene is imaged according to the light field image data. For example, the processing circuit 140 may image the scene SCN according to the light field image data IMD to thereby obtain the image IMG.

In some embodiments, the light field imaging method 700 may move the lens unit toward or away from the optical metasurface to adjust an image plane of the lens unit. For example, the control circuit 460 may move the lens unit 110 toward or away from the optical metasurface 120 to adjust an image plane of the lens unit 110.

In some embodiments, the light signal may pass through an aperture unit before arriving at the optical metasurface. The light field imaging method 700 may change an aperture size of the aperture unit to adjust an amount of light passing through the aperture unit. For example, the control circuit 460 may change the aperture size of the aperture unit 455 to adjust an amount of light passing therethrough.

In some embodiments, the light field imaging method 700 may filter the collected light, and outputting a filtered version of the collected light toward the optical metasurface. For example, the filter device 150 may filter the light signal LS, and output a filtered version of the light signal toward the optical metasurface 120.

As those skilled in the art should understand each operation of the light field imaging method 700 after reading the above paragraphs directed to FIG. 1A to FIG. 6, further description is omitted for the sake of brevity.

With the use of an optical metasurface, the light field imaging system can provide high spatial and angular resolution concurrently. Also, by adjusting a distance between a lens unit and an optical metasurface, the light field imaging system can realize a multi-mode light field imaging scheme. Further, with the use of an adjustable aperture, the light field imaging system can perform aberration correction and reduce the thickness of the lens unit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A light field imaging system, comprising:
    a lens unit, configured to collect input light from a scene;
    an optical metasurface, disposed in an optical path of a first light signal coming from the lens unit and passing through an image plane of the lens unit, the optical metasurface being configured to receive the first light signal passing through the image plane of the lens unit, and modify optical properties of the first light signal passing through the image plane of the lens unit to generate an optical signal, the optical metasurface having a spatially varying optical response to the first light signal; and
    an image sensor, configured to sense the optical signal outputted from the optical metasurface to generate light field image data, wherein generation of the optical signal sensed by the image sensor and reception of the first light signal passing through the image plane of the lens unit occur at the same optical metasurface.

2. The light field imaging system of claim 1, further comprising:
    a first control circuit, coupled to the lens unit, the first control circuit being configured to move the lens unit to adjust a position of the image plane of the lens unit.

3. The light field imaging system of claim 2, wherein the first control circuit is configured to move the lens unit to a predetermined position such that the image plane is located at the optical metasurface, and the optical signal produced by the optical metasurface comprises angular samples of the first light signal.

4. The light field imaging system of claim 2, wherein the first control circuit is configured to move the lens unit to a predetermined position such that the image plane is located between the optical metasurface and the lens unit, and the optical signal produced by the optical metasurface comprises spatial samples of the first light signal.

5. The light field imaging system of claim 2, wherein the first control circuit comprises:
    a driver circuit, configured to generate a drive signal; and
    an actuator, coupled to the driver circuit, the actuator being configured to move the lens unit toward or away from the image sensor according to the drive signal.

6. The light field imaging system of claim 1, further comprising:
    an aperture unit, disposed in the optical path of the first light signal, wherein the first light signal passes through the aperture unit before arriving at the optical metasurface; and
    a second control circuit, coupled to the aperture unit, the second control circuit being configured to change an aperture size of the aperture unit to adjust an amount of light passing through the aperture unit.

7. The light field imaging system of claim 6, wherein the aperture unit and the lens unit are disposed along a first direction; the aperture unit has a plurality of openings arranged in a second direction different from the first direction; the openings have different sizes; the second control circuit is configured to move the aperture unit in the second direction to change the aperture size of the aperture unit.

8. The light field imaging system of claim 7, wherein the second control circuit comprises:
    a driver circuit, configured to generate a first drive signal and a second drive signal; and an actuator, coupled to the driver circuit, the actuator being configured to move the lens unit to adjust a position of an image plane of the lens unit according to the first drive signal, and move the aperture unit in the second direction according to the second drive signal.

9. The light field imaging system of claim 6, further comprising:
a processing circuit, coupled to the image sensor, wherein when the aperture unit uses a first size as the aperture size, the processing circuit is configured to position the scene according to the light field image data; when the aperture unit uses a second size larger than the first size as the aperture size, the processing circuit is configured to capture the scene according to the light field image data.

10. The light field imaging system of claim 6, further comprising:
a processing circuit, coupled to the image sensor, wherein when the aperture unit uses a first size as the aperture size, the processing circuit is configured to obtain a first image of the scene according to the light field image data; when the aperture unit uses a second size larger than the first size as the aperture size, the processing circuit is configured to obtain a second image of the scene according to the light field image data; the processing circuit is configured to perform aberration correction upon the second image according to the first image.

11. The light field imaging system of claim 1, wherein the lens unit is configured to collect the input light to output a second light signal; the light field imaging system further comprises:
a filter device, disposed between the lens unit and the optical metasurface, the filter device being configured to filter the second light signal and output a filtered version of the second light signal toward the optical metasurface, the filtered version of the second light signal serving as the first light signal.

12. The light field imaging system of claim 11, wherein the filter device is an infrared cut-off filter.

13. A light field imaging method, comprising:
utilizing a lens unit to collect input light from a scene and direct collected light toward an optical metasurface, and accordingly producing a light signal passing through an image plane of the lens unit, the optical metasurface having a spatially varying optical response to the collected light;
utilizing the optical metasurface to receive the light signal passing through the image plane of the lens unit to control propagation of the collected light, and accordingly modifying optical properties of the light signal passing through the image plane of the lens unit to generate an optical signal;
utilizing an image sensor to sense the optical signal outputted from the optical metasurface to generate light field image data, wherein generation of the optical signal sensed by the image sensor and reception of the light signal passing through the image plane of the lens unit occur at the same optical metasurface; and
imaging the scene according to the light field image data.

14. The light field imaging method of claim 13, further comprising:
moving the lens unit toward or away from the optical metasurface to adjust the image plane of the lens unit.

15. The light field imaging method of claim 14, wherein when the image plane is located at the optical metasurface, the optical signal produced by the optical metasurface comprises angular samples of the light signal.

16. The light field imaging method of claim 14, wherein when the image plane is located between the optical metasurface and the lens unit, the optical signal produced by the optical metasurface comprises spatial samples of the light signal.

17. The light field imaging method of claim 13, wherein the light signal passes through an aperture unit before arriving at the optical metasurface; the light field imaging method further comprises:
changing an aperture size of the aperture unit to adjust an amount of light passing through the aperture unit.

18. The light field imaging method of claim 17, wherein the step of imaging the scene according to the light field image data comprises:
when the aperture unit uses a first size as the aperture size, positioning the scene according to the light field image data; and
when the aperture unit uses a second size larger than the first size as the aperture size, capturing the scene according to the light field image data.

19. The light field imaging method of claim 17, wherein the step of imaging the scene according to the light field image data comprises:
when the aperture unit uses a first size as the aperture size, obtaining a first image of the scene according to the light field image data;
when the aperture unit uses a second size larger than the first size as the aperture size, obtaining a second image of the scene according to the light field image data; and
performing aberration correction upon the second image according to the first image.

20. An electronic apparatus, comprising:
a display; and
a light field imaging system, placed behind the display and configured to capture a scene in front of the display, the light field imaging comprising:
a lens unit, configured to collect input light from the scene through the display, and accordingly output a light signal;
an optical metasurface, disposed in an optical path of the light signal, the optical metasurface being configured to produce an optical signal in response to the light signal, the optical metasurface having a spatially varying optical response to the light signal; and
an image sensor, configured to sense the optical signal to generate light field image data.

* * * * *